Dec. 20, 1960   H. P. EICHIN ET AL   2,965,230
METHOD OF AND APPARATUS FOR CLASSIFYING UNIT ITEMS
Filed Dec. 6, 1955   2 Sheets-Sheet 2
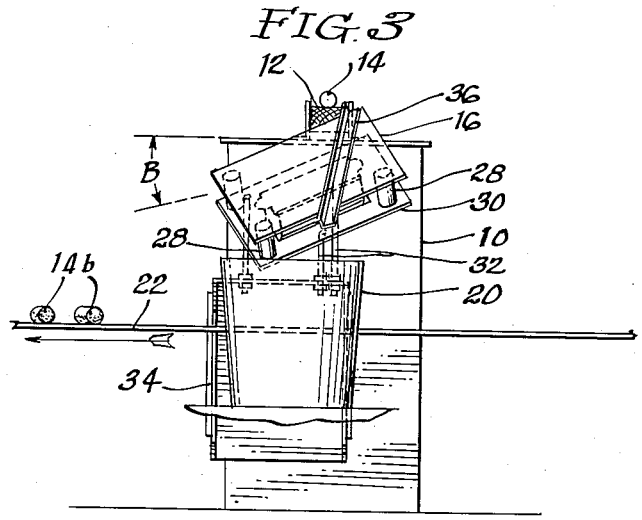
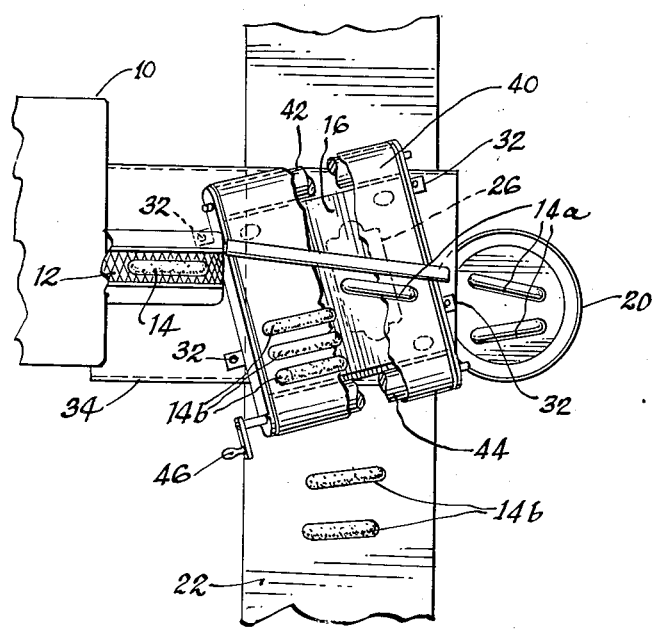
INVENTORS
HARRY P. EICHIN
WERNER STOCK
BY
Attorney

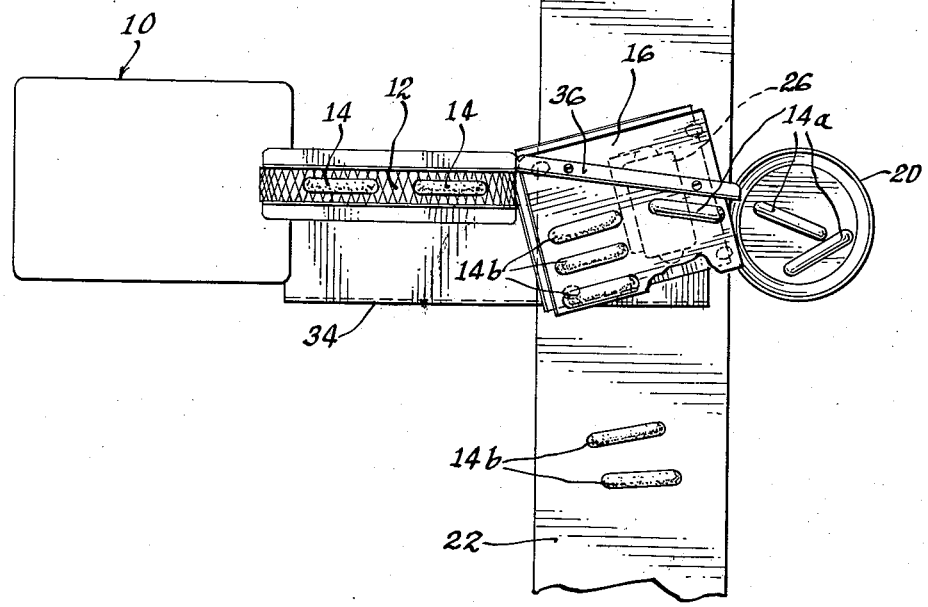
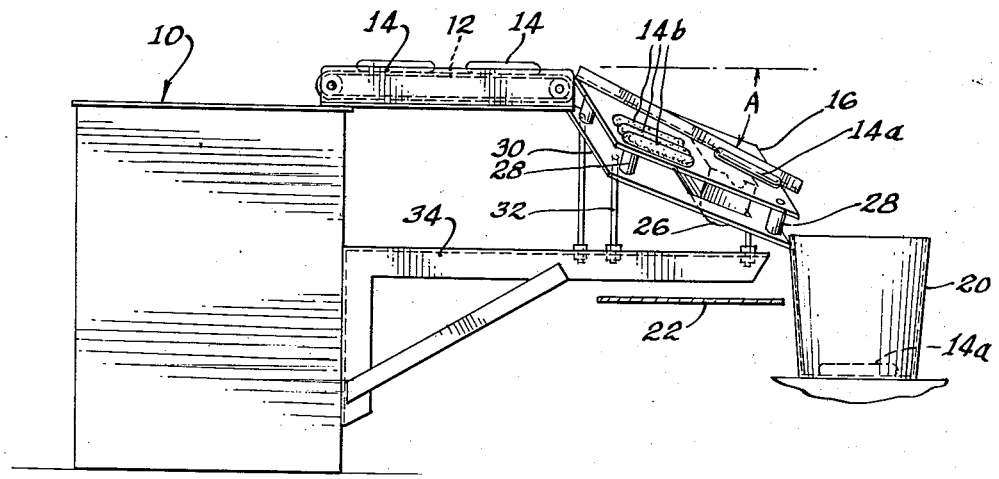

United States Patent Office 2,965,230
Patented Dec. 20, 1960

2,965,230

METHOD OF AND APPARATUS FOR CLASSIFYING UNIT ITEMS

Harry P. Eichin, Western Springs, and Werner Stock, Chicago, Ill., assignors, by mesne assignments, to Union Carbide Corporation, a corporation of New York Filed Dec. 6, 1955, Ser. No. 551,284

5 Claims. (Cl. 209—117)

This invention relates to the classification and segregation of cylindrical unit items. More particularly it relates to a method of and apparatus for classifying and segregating skinless frankfurters from encased frankfurters.

In the production of skinless frankfurters, a cellulosic casing is stuffed with a sausage meat emulsion and the stuffed casing is successively linked, cured as by smoking, cooked, chilled, and finally the casing is peeled from the individual frankfurters. The individual frankfurters are then packaged and shipped.

The peeling operation is performed mechanically by automatic peeling machines. In these machines, the frankfurters, after passing thru the zone of action of the peeling operation are conveyed by a belt to a collection device, or to a station where the frankfurters are packaged for shipment. Though such peeling machines are highly efficient, nevertheless they do not peel the casings from all the frankfurters on which they operate. Since the encased frankfurters and the skinless frankfurters are very similar in appearance, encased frankfurters are frequently shipped as skinless frankfurters. To manually separate the encased and skinless frankfurters from each other is a tedious and labor consuming operation and also requires acute visual perception.

An object of this invention is to provide a method of and apparatus for automatically and expeditiously classifying and segregating cylindrical items whose surfaces have different coefficients of friction.

Another object of this invention is to provide a method of and apparatus for automatically and expeditiously classifying and segregating skinless and encased frankfurters.

Other and additional objects will become apparent hereafter.

The surfaces of skinless frankfurters have a higher coefficient of friction than the surfaces of the casings of encasd frankfurters and this invention is basd thereon.

The above objects are accomplished in general by delivering the frankfurters onto a surface on which because of their respective coefficients of friction, the encased frankfurters will travel, as by sliding freely, with little or no axial rotation, a greater distance lengthwise of said surface, than the skinless frankfurters, whereby classification is effected. After classification, the encased and skinless frankfurters are segregated and separately collected.

In the preferred form of the invention, the classification and segregation are effected in combination with the peeling operation and accordingly, the frankfurters are delivered to the surface by the discharge belt of the peeling machine. Inasmuch as such belt travels at a relatively high speed, the successive frankfurters thereon are projected or ejected on to the classification surface. The momentum imparted by this means of feeding the frankfurters to the classifying surface does not effect the classification. As a matter of fact, it aids in the sliding movment of the frankfurters, particularly the encased items on the classification surface.

Preferably the classification surface is inclined downwardly so that the free sliding movement of the frankfurters, especially the encased ones, is aided by the force of gravity.

In order to automatically remove the classified skinless frankfurter from the surface after its sliding movement lengthwise over the surface has been arrested, the surface is appropriately inclined so that the arrested frankfurter, with its center of gravity on the surface, will roll about its longitudinal axis and thus travel over the surface in a transverse direction to suitable collection devices. For convenince, the angle at which the classifying surface is inclined to permit the rolling movement of the frankfurters, which are circular in cross-section, will herein be referred to as the "azimuth angle."

In general, the classifying surface is vibrated so that the travel of the frankfurters thereon, both skinless and encased as herein described, is accelerated.

In a preferred embodiment, the length of the classifying surface is such that the encased frankfurters will travel by sliding over the entire length thereof and be delivered to an appropriate collection device and the skinless frankfurters will be arrested in their sliding movement at some point on the classifying surface where the center of gravity of the arrested skinless frankfurter will tend to roll about its longitudinal axis and thus travel transversely of the classifying surface and be delivered to a suitable collection device.

The classifying surface should be dry and free of meat, fats, and other substances which will tend to decrease the difference in coefficient of friction of the encased and of the skinless frankfurters.

When the classifying surface becomes contaminated and modifies the coefficient of friction of the frankfurters, it should be replaced with a clean surface. This is accomplished by removing the contaminated surface and replacing it with a clean one. By attaching the surface to a belt, or forming the classifying surface in the form of a belt, movement of the belt will present a clean classifying surface. The movement of the belt may be intermittent or continuous. In either event, a contaminated surface will be removed from the classifying zone of action and thoroughly cleaned and dried, whereupon it may be reused.

In general, the classifying surface can be made of any suitable material, which is not corroded by frankfurters. It can be, for example, made of an appropriate metal, such as aluminum, stainless steel, etc. It likewise can be formed of plastics and ceramics. It also can be formed of fabrics which are not corroded by frankfurters, such as glass fabric, glass or other fabric coated with a non-corrodible material, such as Teflon (polymerised tetrachlorethylene), metals, etc. When the surface is of a non-rigid material, it may be removably secured to a rigid support as a plate.

The length of the classifying surface must be greater than the length of the unit items fed thereto. Highly satisfactory results have been secured with classifying surfaces approximately 2 to 4 times the length of the unit items to be classified. With a surface of such length, the items with the smaller coefficient of friction, i.e., encased frankfurters, will slide over the entire length of the classifying surface, and be delivered into an appropriate collection device.

The width of the classifying surface must be of a dimension to support the frankfurters. In general, satisfactory results have been obtained when the width of the surface is from 4 to 8 times the diameter of the frankfurters.

The angle of inclination at which the classification surface is positioned can vary within wide limits. Satisfactory results are secured when the angle of inclination from the horizontal is from about 17° to about 30° and the azimuth angle is from about 1° to about 25°.

The nature of the invention and the manner in which it may be practiced will become clear from the following detailed description when taken in conjunction with the accompanying drawings forming a part of this specification and wherein:

Figure 1 is a top plan view of an apparatus embodying the principles of this invention for the classification and segregation of skinless and encased frankfurters, and in which the peeling mechanism is shown diagrammatically, Figure 2 is a side elevation of the apparatus shown in Figure 1, Figure 3 is an end elevation of the apparatus shown in Figure 1, and Figure 4 is a top plan view (partly broken away) of another embodiment of the invention.

Referring now to the drawings wherein like reference numbers designate like parts, the reference numeral 10 designates an automatic peeling machine with a discharge conveyor 12 transporting and delivering the unsegregated frankfurters 14 to a sloping aluminum plate 16 which, as herein described, serves to automatically classify and segregate skinless frankfurters and encased frankfurters from which the peeling mechanism failed to peel the casings. Inasmuch as the peeling machine 10 is well known and available in the market and its specific details form no part of this invention, a detailed description of its construction and operation is not necessary.

As shown in Figures 1-3, sloping plate 16 is positioned to receive a progression of frankfurters 14 discharged from conveyor 12. Plate 16 is positioned at an angle "A," such as preferably 22° below the horizontal delivery axis of the frankfurters discharged from conveyor 12 whereby due to the force of gravity, each frankfurter 14 will freely slide, with little or no axial rotation about its longitudinal axis, until it is discharged from plate 16, or, because of its coefficient of friction, its original sliding movement is arrested. Inasmuch as conveyor 12 travels at a relatively high speed, each frankfurter 14 is projected onto sloping plate 16 and the momentum imparted thereto combines with the force of gravity to accelerate the sliding movement previously mentioned.

In the form shown in Figures 1-3, the length of sloping plate 16 is such that encased frankfurters 14$^a$ will freely slide over the entire length of said plate and be discharged into a suitable collection device, such as a receptacle 20 and permit the sliding movement of skinless frankfurters 14$^b$ to be arrested while the center of gravity of such frankfurters 14$^b$ is on plate 16.

Plate 16 is also inclined at an azimuth angle B, such as preferably 14° to the horizontal, so that the arrested frankfurters 14$^b$ will tend to move sidewise from the locus of deposition by rotatably rolling transversely across plate 16 and be discharged onto conveyor 22, which transports the skinless frankfurters to a packaging station, not shown. In order to accelerate the movement of the frankfurters thereon, plate 16 is caused to vibrate by attachment to any suitable well known vibrating energy source 26, which can be varied to operate at a specific frequency of vibration.

Plate 16 is removably affixed by well known vibration isolation mounts 28 to base plate 30, which in turn is secured by adjustable supports 32 to bracket 34 secured to the frame of peeling machine 10. The supports 32 are of sizes capable of being adjusted to provide the desired inclinations to plate 16.

An adjustable fence 36 is secured to plate 16 by clamps, not shown, to further guide frankfurters 14$^a$ to collection receiver 20.

In practice for the classification and segregation of frankfurters 6" long, highly satisfactory results are obtained when plate 16 is 12"-14" long and 4" wider than the diameter of the frankfurters being classified, angle A is 22° and azimuth angle B 14° and the rate of delivery of the frankfurters is up to 200 per minute. Under these conditions, encased frankfurters 14$^a$ will freely slide, with little or no axial rotation, lengthwise on surface 16 and be discharged into receptacle 20 and the initial sliding movement of skinless frankfurters 14$^b$ will be arrested shortly after deposition on surface 16. Due to the azimuth disposition of surface 16, the arrested frankfurters 14$^b$ will rotatably roll at substantially a right angle to the axis of delivery to plate 16. The vibration of plate 16 also aids the frankfurters to travel as described.

When the surface of plate 16 becomes contaminated, the operation of the machine is interrupted and the plate cleansed or the contaminated plate removed and a clean one substituted therefor.

To avoid interruption of the machine, the classifying surface may, as shown in Figure 4, be in the form of a continuous belt 40, having a non-corrodible surface, such as one formed of Teflon coated fabric, cooperating with rolls 42 and 44, which are arranged to permit the upper flight of belt 40 to rest on plate 16. Thus, when the operative surface of belt 40 becomes contaminated, roll 42 is actuated manually thru handle 46 and a clean surface positioned in operative position. The contaminated surface of the belt, while out of operative position, is cleansed and dried so that it can again be reused in the classifying and segregation operations. If desired, the belt 40 can be mechanically operated, either continuously or intermittently.

As is clear from the foregoing, the classification and segregation of encased and skinless frankfurters is preferably carried out in combination with a peeling machine. However, a progression of frankfurters to be classified and segregated can be fed to the classifying and segregating surface in any other convenient manner.

Though the invention is particularly adapted to the classification and segregation of skinless and encased frankfurters, it also can be used for the classification and segregation of any cylindrical items whose surfaces have different coefficients of friction.

The invention provides a simple and automatic classification and segregation of unit items whose surfaces have different coefficients of friction, particularly encased and skinless frankfurters.

Since it is obvious that various changes and modifications may be made in the above description without departing from the nature or spirit thereof, this invention is not restricted thereto, except as set forth in the appended claims.

We claim:

1. An apparatus for classifying and segregating cylindrical unit items having different coefficients of friction, such as skinless and encased frankfurters, which comprises a structure having an inclined surface, means to project onto the upper part of said inclined surface and to slide lengthwise along the length of said surface a succession of unclassified cylindrical units, means to position said surface to incline it downwardly from the horizontal to permit sliding movement of said cylindrical units lengthwise thereon until arrested in accordance with their coefficient of friction, said sliding movement being imparted to the cylindrical unit by said projecting means and being in the same general direction as imparted to the cylindrical units by said projecting means and means to position said surface at an azimuth angle to the horizontal to cause the arrested items to rotatably roll on said surface in a direction transverse to the length of said surface, said surface being of a length permitting the items with the smaller coefficient of friction to travel over the entire length of said surface and the items having a higher coefficient of friction to be arrested on said surface.

2. An apparatus as set forth in claim 1, wherein vibrating means are operatively connected to the surface.

3. An apparatus as set forth in claim 1 wherein the surface is that of a belt and means are provided to move said belt to dispose a clean surface into operative position.

4. A method of classifying and segregating dimensionally similar cylindrical unit items whose surfaces have different coefficients of friction which comprises successively projecting in the same trajectory path each of the unit items onto a surface to slide thereover in the direction of their longitudinal axis, whereby the items having the smaller coefficient of friction will slidably move over the entire length of said surface to a collection device and the items having the higher coefficient of friction will be arrested on said surface, causing the arrested items to roll about the longitudinal axis thereof and travel over said surface in a transverse direction to a collection device, and separately collecting the differently classified items.

5. A method as set forth in claim 4 wherein the items are skinless and encased frankfurters.

References Cited in the file of this patent

UNITED STATES PATENTS

| | | |
|---|---|---|
| 343,999 | Lucas | June 22, 1886 |
| 1,283,284 | Payne | Oct. 29, 1918 |
| 1,292,820 | Lindsley | Jan. 28, 1919 |
| 1,426,957 | Chindbloom | Aug. 22, 1922 |
| 1,686,374 | Franks | Oct. 2, 1928 |
| 2,217,492 | Peachey | Oct. 8, 1940 |
| 2,788,124 | Miller | Apr. 9, 1957 |

FOREIGN PATENTS

| | | |
|---|---|---|
| 623,536 | Great Britain | May 19, 1949 |